US012699603B2

(12) United States Patent
Jheng et al.

(10) Patent No.: US 12,699,603 B2
(45) Date of Patent: Aug. 4, 2026

(54) SYSTEM AND METHOD FOR PROVIDING CONTENT OF AN APPLICATION PROGRAMMING INTERFACE SERVER TO A USER COMPUTER

(71) Applicant: Super Micro Computer, Inc., San Jose, CA (US)

(72) Inventors: Jian Liang Jheng, New Taipei City (TW); Cheng-Yi Fang, New Taipei City (TW)

(73) Assignee: Super Micro Computer, Inc., San Jose, CA (US)

( * ) Notice: Subject to any disclaimer, the term of this patent is extended or adjusted under 35 U.S.C. 154(b) by 477 days.

(21) Appl. No.: 18/449,296

(22) Filed: Aug. 14, 2023

(65) Prior Publication Data

US 2025/0061007 A1 Feb. 20, 2025

(51) Int. Cl.
*G06F 9/46* (2006.01)
*G06F 9/54* (2006.01)
*G06F 16/957* (2019.01)

(52) U.S. Cl.
CPC .............. *G06F 9/54* (2013.01); *G06F 16/957* (2019.01)

(58) Field of Classification Search
CPC .................................. G06F 9/54; G06F 16/957
USPC .......................................................... 719/328
See application file for complete search history.

(56) References Cited

U.S. PATENT DOCUMENTS

| | | | |
|---|---|---|---|
| 10,929,211 B1* | 2/2021 | Mylavarapu | G06F 11/3466 |
| 11,138,033 B1* | 10/2021 | Sem | G06F 9/54 |
| 2017/0346875 A1* | 11/2017 | Wells | H04L 67/568 |

FOREIGN PATENT DOCUMENTS

CN 108881448 A * 11/2018 ............. H04L 67/63

OTHER PUBLICATIONS

"API", Wikipedia, downloaded May 31, 2023, https://en.wikipedia.org/wiki/API, 11 pages.
"Microservices", Wikipedia, downloaded May 31, 2023, 8 pages. https://en.wikipedia.org/wiki/Microservices.
"Model-View-Controller", Wikipedia, downloaded May 31, 2023, https://en.wikipedia.org/wiki/Model-view-controller, 7 pages.
"Single-Page Application", Wikipedia, downloaded Jul. 24, 2023, https://en.wikipedia.org/wiki/Single-page_application, 8 pages.
"Software Framework", Wikipedia, downloaded May 31, 2023, https://en.wikipedia.org/wiki/Software_framework, 4 pages.

(Continued)

*Primary Examiner* — Diem K Cao
(74) *Attorney, Agent, or Firm* — Beyer Law Group LLP

(57) ABSTRACT

System and method for providing content of an application programming interface (API) server to a user computer are disclosed. A webpage in the user computer includes program code to make web user interface (UI) calls to a web server. A web UI call that corresponds to a web UI specification includes an API identifier, which corresponds to an API specification. The API specification is identified from among several API specifications using the API identifier. The API specification includes a route to an API server. A parameter included in the web UI call is checked for conformance to the API specification. In response to the parameter conforming to the API specification, an API request is made to the API server. A component of the webpage is rendered using a result of the API request provided by the API server.

7 Claims, 9 Drawing Sheets

(56)     References Cited

OTHER PUBLICATIONS

"User Interface Specification", Wikipedia, 4 pages. https://en.
wikipedia.org/wiki/User_interface_specification#:~:text=A.
"What is OpenAPI?", OpenAPI Initiative, downloaded May 31,
2023, https://www.openapis.org/what-is-openapi, 7 pages.
"What is Three-Tier Architecture?", IBM, downloaded May 31,
2023, https://www.ibm.com/topics/three-tier-architecture, 7 pages.

* cited by examiner

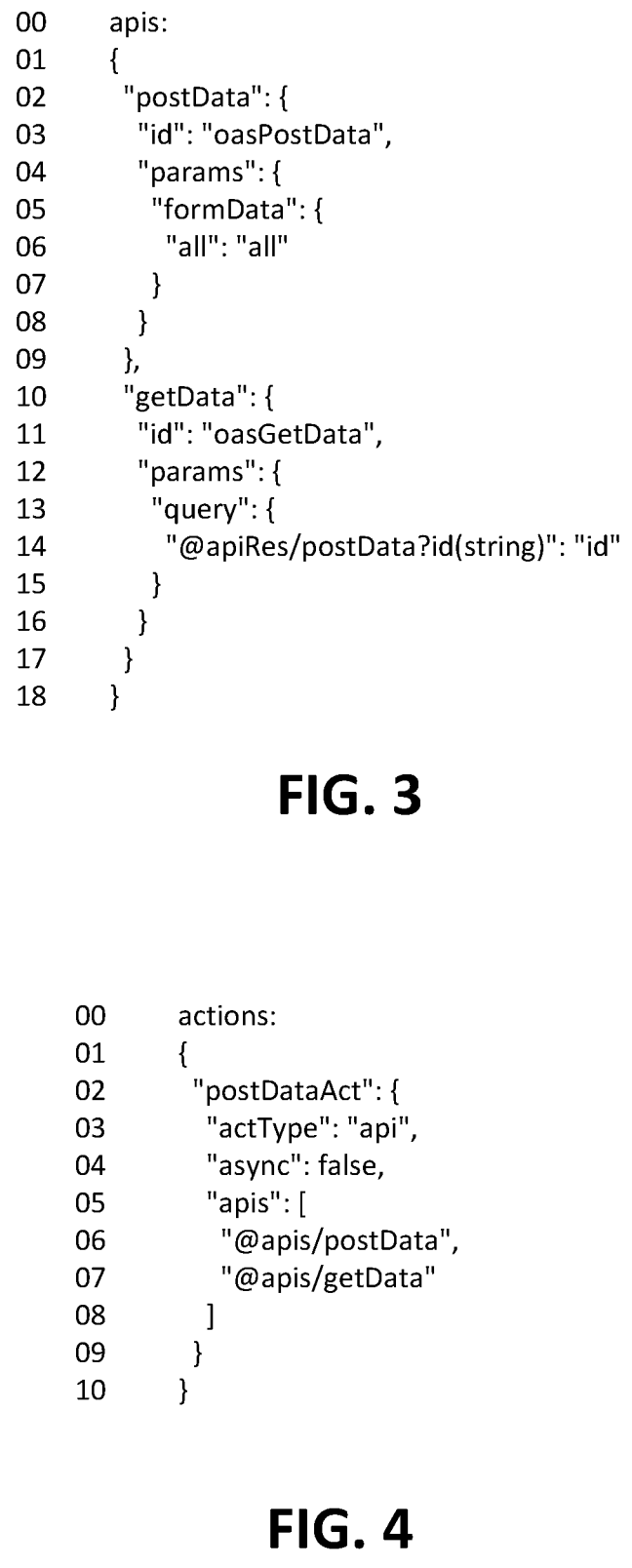

```
00    apis:
01    {
02     "postData": {
03      "id": "oasPostData",
04      "params": {
05       "formData": {
06        "all": "all"
07       }
08      }
09     },
10     "getData": {
11      "id": "oasGetData",
12      "params": {
13       "query": {
14        "@apiRes/postData?id(string)": "id"
15       }
16      }
17     }
18    }
```

FIG. 3

```
00    actions:
01    {
02     "postDataAct": {
03      "actType": "api",
04      "async": false,
05      "apis": [
06       "@apis/postData",
07       "@apis/getData"
08      ]
09     }
10    }
```

FIG. 4

```
00    langs:
01    {
02      "en": {
03        "hello": "Hello",
04        "submit": "Submit"
05      }
06    }
```

FIG. 5

```
00    variables:
01    {
02      "tableCols": [
03        {
04          "title": "@langs/name",
05          "dataIndex": "name"
06        },
07        {
08          "title": "@langs/createAt",
09          "dataIndex": "createAt",
10          "type": "time"
11        }
12      ]
13    }
```

FIG. 6

```
00    pages:
01    {
02     "dataList": {
03       "beforeRender": [
04         "@actions/getDataAct"
05       ],
06       "page": [
07         {
08           "component": "Button",
09           "attrs": {
10             "onClick": "@actions/postDataAct",
11             "value": "@langs/submit"
12           }
13         },
14         {
15           "component": "Table",
16           "attrs": {
17             "dataSrc": "@apiRes/getData?self(array)",
18             "columns": "@variables/tableCols"
19           }
20         }
21       ]
22     }
23    }
```

FIG. 7

```
00    routes:
01    [
02      {
03        "key": "/dataList",
04        "title": "@langs/dataList",
05        "menu": true,
06        "icon": "fa fa-cubes",
07        "component": "@pages/dataList"
08      }
09    ]
```

FIG. 8

```
00   // Frontend
01   Load web UI space;
02   Parse route definition from Web UI spec;
03   Routes init;
04   Render components;
05   Definition transform;
06   switch(defined type) {
07     case actions:
08     Event happened;
09     Parse action definition from Web UI spec;
10     Transfer event to action type;
11     switch(action type) {
12       case api:
13         Send API ID and parameters to Backend Dispatcher;
14         break;
15       case pageRender:
16         Render sub webpage;
17         break;
18       case redirect:
19         Do redirect action;
20         break;
21     }
22     break;
23     case pages:
24       Parse page definition from Web UI spec;
25       Render webpage components;
26       break;
27     case apis:
28       Transfer api action to API ID of API spec;
29       break;
30     case lang:
31       Transfer definition to multi-language.
32       break;
33   }
```

FIG. 9

```
00    // Backend Dispatcher
01    Receive API ID and parameters from Frontend;
02    Send API ID and parameters to message queue;
```

FIG. 10

```
00    // Backend Relay Worker
01    Get API ID and parameters from message queue;
02    Parse API definition from API spec;
03    Check the parameters conform to the API definition
04    Transfer API ID to API URL and method;
05    Send API request;
06    Flow result to frontend
```

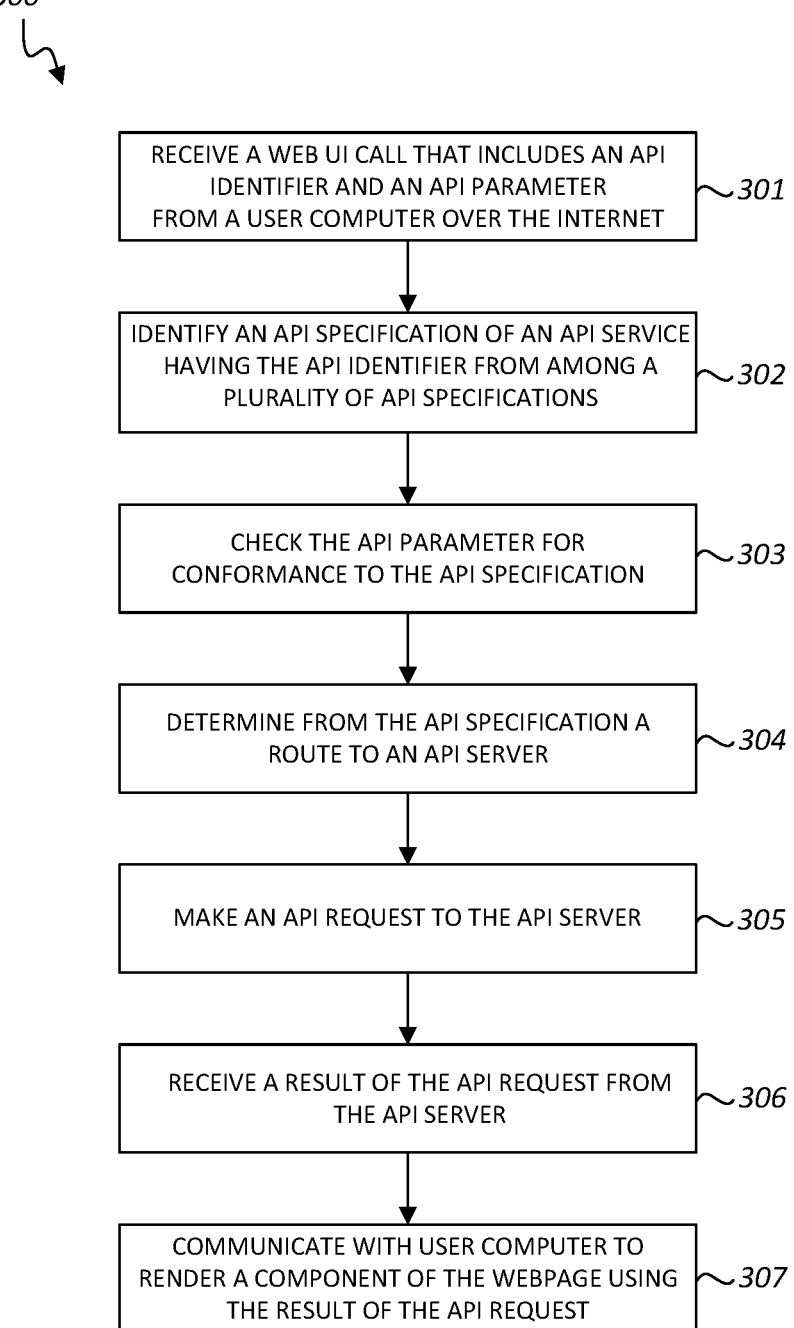

RECEIVE A WEB UI CALL THAT INCLUDES AN API IDENTIFIER AND AN API PARAMETER FROM A USER COMPUTER OVER THE INTERNET ~*301*

IDENTIFY AN API SPECIFICATION OF AN API SERVICE HAVING THE API IDENTIFIER FROM AMONG A PLURALITY OF API SPECIFICATIONS ~*302*

CHECK THE API PARAMETER FOR CONFORMANCE TO THE API SPECIFICATION ~*303*

DETERMINE FROM THE API SPECIFICATION A ROUTE TO AN API SERVER ~*304*

MAKE AN API REQUEST TO THE API SERVER ~*305*

RECEIVE A RESULT OF THE API REQUEST FROM THE API SERVER ~*306*

COMMUNICATE WITH USER COMPUTER TO RENDER A COMPONENT OF THE WEBPAGE USING THE RESULT OF THE API REQUEST ~*307*

FIG. 12

SYSTEM AND METHOD FOR PROVIDING CONTENT OF AN APPLICATION PROGRAMMING INTERFACE SERVER TO A USER COMPUTER

COPYRIGHT NOTICE

TECHNICAL FIELD

The present disclosure is directed to webpages and application programming interface servers.

BACKGROUND

A webpage is a document on the World Wide Web that is viewable using a web browser running on a user computer. A webpage includes one or more components that are rendered to provide a web user interface (UI). The web UI may receive an input from a user, display content on a display screen of the user computer, etc.

Although a webpage is served to the user computer by a web server, content retrieved in accordance with program code of the webpage is not necessarily from the web server. More particularly, some web servers, also referred to herein as application programming interface (API) servers, provide one or more APIs for accessing their content. A webpage may thus require content available from the web server that served the webpage and/or from an API server. However, since the API server is typically a third-party relative to the web server, the design, implementation, and maintenance of such a webpage are time consuming, relatively complicated, and require much coordination between frontend developers responsible for the web UI and backend developers responsible for accessing the API server.

BRIEF SUMMARY

In one embodiment, a webpage in a user computer includes program code to make web user interface (UI) calls to a web server. A web UI interface call that corresponds to a web UI specification includes an application programming interface (API) identifier, which corresponds to an API specification. The API specification is identified from among several API specifications using the API identifier. The API specification includes a route to an API server. Parameters included in the web UI call are checked for conformance to the API specification. In response to the parameters conforming to the API specification, an API request is made to the API server. The API request includes the parameters and is sent to the API server in accordance with the route obtained from the API specification. A result of the API request is returned by the API server. A component of the webpage is rendered using the result of the API request.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 3-8 show example implementations of a web UI specification in accordance with embodiments of the present invention.

FIG. 9 shows a pseudo code for implementing a frontend module in accordance with an embodiment of the present invention.

FIG. 10 shows a pseudo code for implementing a backend dispatcher in accordance with an embodiment of the present invention.

FIG. 11 shows a pseudo code for implementing a backend worker in accordance with an embodiment of the present invention.

FIG. 12 shows a flow diagram of a method of providing content of an application programming interface (API) server to a user computer in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
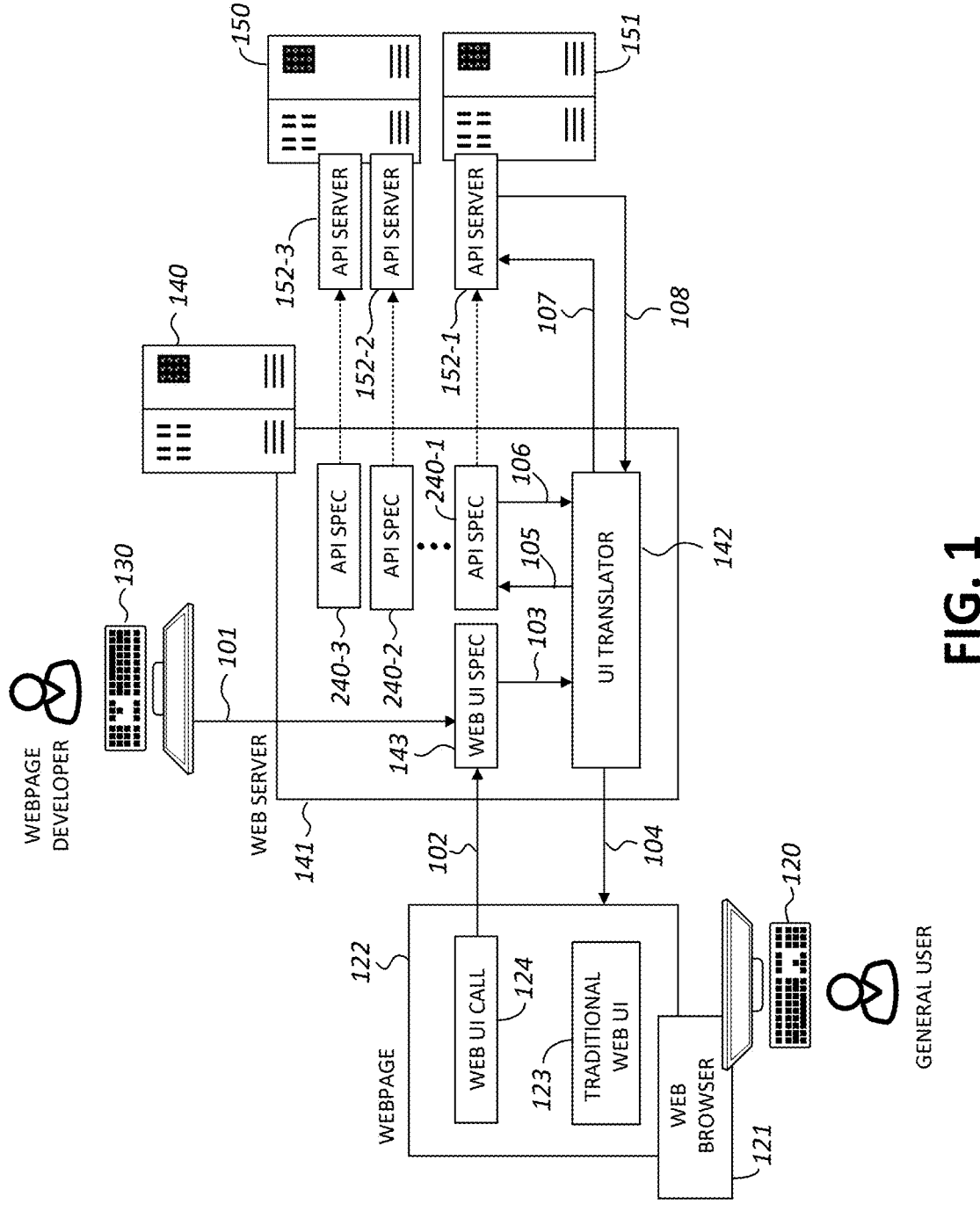
FIG. 1 shows a schematic block diagram of a web server in accordance with an embodiment of the present invention.

FIG. 1 shows a schematic block diagram of a web server 141 in accordance with an embodiment of the present invention. The web server 141 serves one or more webpages 122 of a website. In the example of FIG. 1, the web server 141 is implemented as program code and runs on a host 140. Generally, a "host" may comprise a dedicated server computer system, a virtual machine, a cloud computing platform (e.g., Amazon Web Services (AWS®) platform), or other computer system. The host 140 includes a storage device for storing the one or more webpages 122 of the website, which may be for social network, ecommerce, online banking, or other service available over the public Internet.

A user computer 120 may be a desktop computer, workstation, laptop computer, mobile device, tablet, or other computing device employed by a general user. The term "general user" refers to a typical user who accesses the website, as opposed to a webpage developer who writes the program code of the webpage 122 and/or the web server 141. The user computer 120 runs a web client, which in this example is a web browser 121. The general user employs the web browser 121 to access the webpages 122. For example, the web browser 121 may be pointed to the uniform resource locator (URL) of a webpage 122 to request the web server 141 to serve the webpage 122 to the user computer 120.

As is well-known, a web browser translates program code of a webpage to communicate with a web server and receive information for rendering components of the webpage. The web browser, in accordance with program code of the webpage, may request and receive content from the web server, and provide input data to the web server. FIG. 1 shows interactions directly between the webpage 122 and the web server 141 for case of illustration only. More particularly, FIG. 1 schematically shows how program code of the webpage 122 relate to operations of the web server 141.

A webpage 122 may include program code that provide traditional (i.e., conventional) web UI 123. Such program code may be in the form of HyperText Markup Language (HTML), JavaScript (JS), Cascading Style Sheets (CSS), JS Router, application programming interface (API), etc. The web server 141 may provide content to the web browser 121 in accordance with a web UI call 124; the web browser 121 may render the content as per the traditional web UI 123. Similarly, the web server 141 may receive input data from the web browser 121 in accordance with the traditional web UI 123. In one embodiment, the webpage 122 may further include program code for making a web UI call 124 that is in accordance with a web UI specification ("web UI spec") 143. As will be more apparent below, the web UI specification 143 may facilitate making API requests to API servers 152 (i.e., 152-1, 152-2, 152-3, etc.).

An API server 152 processes API requests for an API service. An API server 152 may be a conventional API server, such as third-party API servers. In the example of FIG. 1, a host 151 hosts a single API server 152 (i.e., 152-1), whereas a host 150 hosts a plurality of API servers 152 (i.e., 152-2 and 152-3).

An API server 152 has a corresponding API specification for processing API requests. In the example of FIG. 1, the API server 152-1 has a corresponding API specification ("API spec") 240-1, the API server 152-2 has a corresponding API specification 240-2, and the API server 152-3 has a corresponding API specification 240-3. An API specification 240 may be a normalized API specification, such as in accordance with the OpenAI Specification (OAS) version 3.0.3, for example.

An API request may be made by making an API call for API service to an API server 152. The API specification 240 of the API server 152 indicates a route (e.g., URL) to the API server 152, parameters accepted by the API server 152 for the requested API service, etc. The API server 152 may process a valid API request by providing a result responsive to the API request, such as content requested by the API request.

A webpage developer employs a computer 130 to create a webpage 122 with program code in accordance with the web UI specification 143 that, among other features, make API requests to the API servers 152 (see arrow 101). In one embodiment, the API specifications 240 are loaded in the host 140. Each API specification 240 includes a listing of API services of the corresponding API server 152, with each API service having an assigned API identifier. To receive content from an API server 152, the web UI specification 143 indicates an API identifier of an API service and one or more parameters of the API service, which are defined in a corresponding API specification 240.

A UI translator 142 of the web server 141 is configured to identify the API specification 240 that corresponds to the API identifier, i.e., the API specification 240 that has definitions for the API service identified by the API identifier. The UI translator 142 checks the parameters for conformance to the API specification 240 and, if the parameters conform to the API specification 240, makes the API request to the API server 152. The API request includes the parameters and is sent to the API server 152 using the route from the API specification 240. The parameters are not in conformance with the API specification 240 if the parameters are not legal, not correct, or otherwise not valid as defined in the API specification 240.

In an example operation, the user computer 120 of the general user runs a web browser 121 that requests the webpage 122 from the web server 141. The webpage 122 includes program code for making the web UI call 124 in accordance with the web UI specification 143. The web browser 121 makes the web UI call 124 to the web server 141 (see arrow 102). The UI translator 142 receives the web UI call 124, detects that the web UI call 124 is in a format of the web UI specification 143, and operates in accordance with the web UI specification 143 and parameters included in the web UI call 124.

The UI translator 142 translates the web UI call 124 in accordance with corresponding information in the web UI specification 143 (see arrow 103). The web UI call 124 may simply involve frontend rendering logic of the web server 141, e.g., does not require service from an API server 152. For example, the web UI call 124 may be for webpage redirection, form rendering, etc. As another example, the web UI call 124 may be for receiving input data or other information from the user computer 120. In these examples, the UI translator 142 services the web UI call 124 (see arrow 104) in conjunction with the traditional web UI 123 of the webpage 122.

The web UI call 124 may also be for a request to receive content from or to provide input data to a particular API server 152. In that case, the web UI call 124, in accordance with the web UI specification 143, includes an API identifier of an API service defined in an API specification 240 of the API server 152, and one or more parameters that conform to the API specification 240.

In the example operation, the web UI call 124 is a request to receive content from the API server 152-1. The UI translator 142 receives the API identifier of the API service, identifies the API specification 240-1 from among the plurality of API specifications 240 as having definitions for the API service identified by the API identifier (see arrow 105), checks the parameters for conformance to the API specification 240-1, and obtains from the API specification 240-1 the route to the API server 152-1 (see arrow 106). In response to the parameters conforming to the API specification 240-1, the UI translator 142 makes an API request for the API service to the API server 152-1 (see arrow 107). The API request includes the parameters of the API service and is sent to the API server 152-1 using the route, e.g., URL of the API server 152-1, obtained from the API specification 240-1. The UI translator 142 receives the requested content from the API server 152-1 (see arrow 108), and communicates with the web browser 121 to render a component of the webpage 122 using the requested content (see arrow 104). As a particular example, the requested content may be data for a table of the webpage 122. In that example, the web browser 121 populates the table with the requested content.

Figure 2:
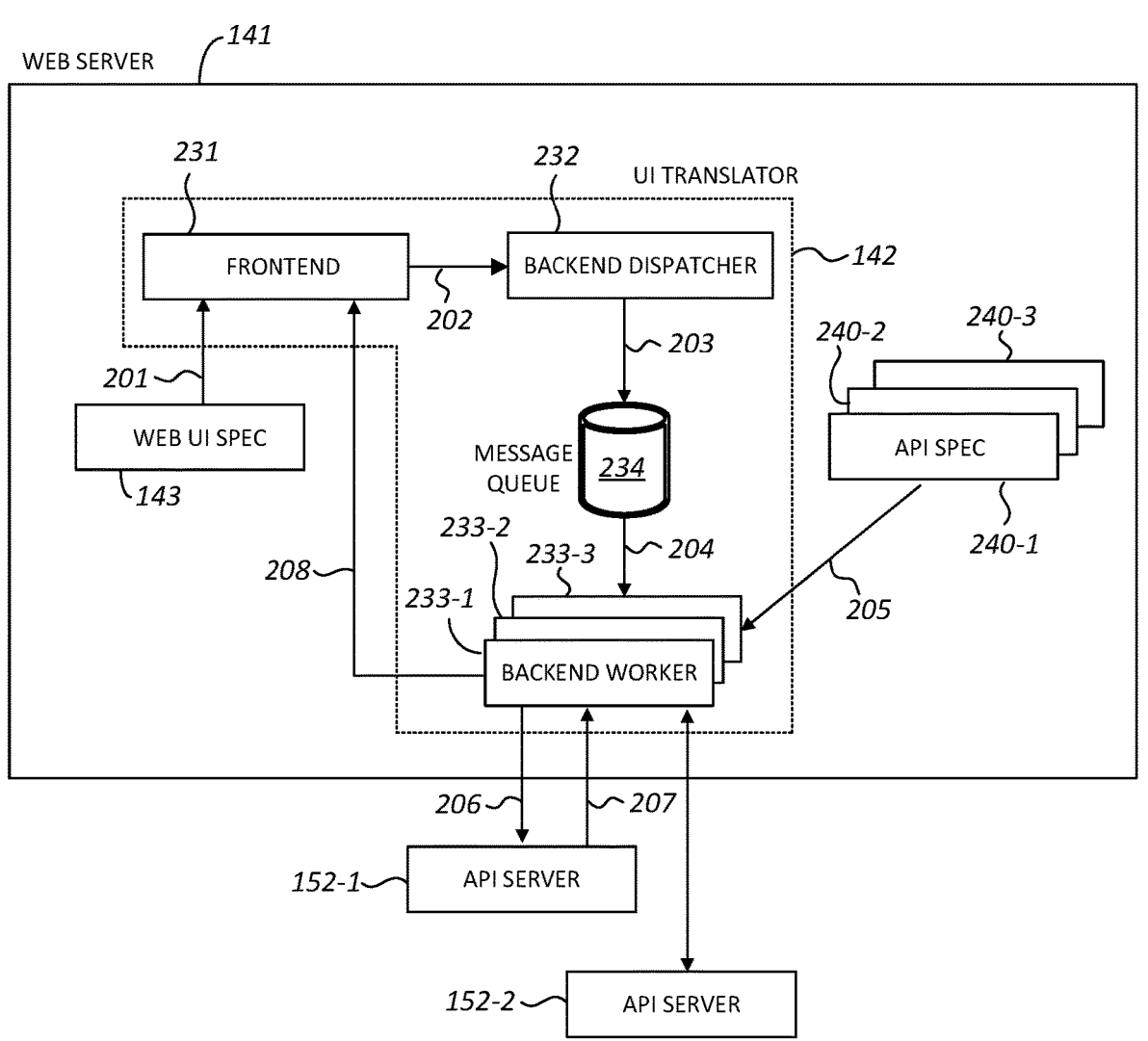
FIG. 2 shows a schematic block diagram of a user interface (UI) translator of the web server of FIG. 1 in accordance with an embodiment of the present invention.

FIG. 2 shows a schematic block diagram of the UI translator 142 of the web server 141 in accordance with an embodiment of the present invention. The UI translator 142 may comprise a frontend module 231, a backend dispatcher 232, and a plurality of backend workers 233 (i.e., 233-1, 233-2, 233-3, etc.). FIG. 2 shows the web UI specification 143 and the API specifications 240 of respective API servers 152.

The frontend module 231 receives and processes web UI calls in accordance with the web UI specification 143. In one embodiment, the web UI specification 143 defines frontend rendering logic. The web UI specification 143 may define (a)

API identifiers of API services and corresponding parameters (e.g., see FIG. 3); (b) actions to be performed, such as making an API request, rendering a form (Form Open), rendering a function component of a webpage, redirecting to another webpage (Page Redirect), etc. (e.g., see FIG. 4); (c) multilingual texts to be rendered (e.g., see FIG. 5); (d) static parameter values required by the website (e.g., see FIG. 6); (c) webpage components to be rendered on the web browser of the user computer (e.g., see FIG. 7); and (f) the routes (e.g., URLs) for webpage components of the website (e.g., see FIG. 8).

FIGS. 3-8 show example implementations of the web UI specification 143 in JavaScript Object Notation (JSON) format, in accordance with an embodiment of the present invention.

FIG. 3 shows an example implementation of the web UI specification 143 to declare API identifiers and parameters. In the example of FIG. 3, an API service for posting data has an assigned API identifier "oasPostData" and associated parameters (FIG. 3, lines 02-06). Also in the example of FIG. 3, an API service for getting data has an assigned API identifier "oasGetData" and associated parameters (FIG. 3, lines 10-14).

FIG. 4 shows an example implementation of the web UI specification 143 to perform actions. In the example of FIG. 4, the actions include making API requests to post data (FIG. 4, line 06) and to get data (FIG. 4, line 07). The action type is API (FIG. 4, line 03), which is one of several types of actions that can be performed in accordance with the web UI specification 143. Note that the example of FIG. 4 indicates API identifiers previously declared in the example of FIG. 3.

FIG. 5 shows an example implementation of the web UI specification 143 to indicate multilingual text to be rendered. In the example of FIG. 5, text to be rendered are in the English language (FIG. 5, line 02), and includes "Hello" (FIG. 5, line 03) and "Submit" (FIG. 5, line 04). The example of FIG. 5 allows texts of the webpage to be rendered in a particular natural language.

FIG. 6 shows an example implementation of the web UI specification 143 to indicate static parameter values required by the website of the web server 141. In the example of FIG. 6, the variables are for columns of a table (FIG. 6, lines 02-12).

FIG. 7 shows an example implementation of the web UI specification 143 to indicate webpage components to be rendered on the web browser 121 of the user computer 120. In the example of FIG. 7, the webpage gets a listing of data via an action "getDataAct" before page rendering (FIG. 7, lines 02-05), and the webpage components includes a button (FIG. 7, lines 08-011) and a table (FIG. 7, lines 15-18).

FIG. 8 shows an example implementation of the web UI specification 143 to indicate routes of webpage components on the website (FIG. 8, lines 03-07).

The operation of the web server 141 is now further explained with reference to FIG. 2 and FIGS. 9-11.

FIG. 9 shows a pseudo code for implementing the frontend module 231 in accordance with an embodiment of the present invention. In the example of FIG. 9, the frontend module 231 allocates memory to perform web UI functionality (FIG. 9, line 01) and obtains route definitions of web page components as per the web UI specification 143 (FIG. 9, line 02).

The frontend module 231 performs an action (FIG. 9, lines 11-21) as per the web UI specification 143 (FIG. 2, arrow 201). An example action is to make an API request. In that case, the frontend module 231 sends the API identifier and parameters for making the API request to the backend dispatcher 232 (FIG. 9, lines 12-14). Other example actions that may be performed by the frontend module 231 include rendering a subcomponent (e.g., dialog, drawer, tab content) of a webpage (FIG. 9, lines 15-17), and redirecting to another webpage (FIG. 9, lines 18-120).

The frontend module 231 may also, in accordance with the web UI specification 143, render webpage components (FIG. 9, lines 23-26), provide the API identifier and parameters to the backend dispatcher 232 (FIG. 9, lines 27-29), and convert text of the webpage to a specified natural language (FIG. 9, lines 30-32).

The frontend module 231 receives a result of an API request from the backend worker 233. The frontend module 231 communicates with the web browser on the user computer to render a component of the webpage using the result of the API request. In accordance with the Single-Page Application (SPA) architecture, the frontend module 231 renders only those components of the webpage that need to be updated (FIG. 9, lines 15-17). The frontend module 231 may also render the entire webpage if the entire webpage needs to be updated (FIG. 9, lines 23-26).

The frontend module 231 may be implemented in accordance with the React JavaScript (JS) component technology framework, Angular JS framework, Vue JS framework, or other JS framework etc. by componentization. The images required for rendering by common web services may be individually packaged into independent and general components, e.g., Button, Table, Dialog, Sidebar, etc. The web UI specification 143 may be used to define the website screen to be rendered with these general components.

In one embodiment, the backend dispatcher 232 and the backend workers 233 provide the backend logic of the web server 141. The backend logic operates to make an API request to an API server 152, and receive from the API server 152 a result that is responsive to the API request.

FIG. 10 shows a pseudo code for implementing the backend dispatcher 232 in accordance with an embodiment of the present invention. In the example of FIG. 10, the backend dispatcher 232 receives an API identifier and associated parameters from the frontend module 231 (FIG. 10, line 01; see FIG. 2, arrow 202). The backend dispatcher 232 may communicate with the frontend module 231 by way of a web socket. The backend dispatcher 232 then sends the API identifier and parameters (as applicable) to a message queue 234 (FIG. 10, line 02; see FIG. 2, arrow 203).

FIG. 11 shows a pseudo code for implementing a backend worker 233 in accordance with an embodiment of the present invention. In one embodiment, a single backend worker 233 is assigned to make one or more API requests. The backend worker 233 retrieves an API identifier and associated parameters from the message queue 234 (FIG. 11, line 01; see FIG. 2, arrow 204). The backend worker 233 identifies an API specification 240 that includes the API identifier of the API service (see FIG. 2, arrow 205). The backend worker 233 parses the API specification 240 to obtain API definitions of the API service, including parameters accepted by the corresponding API server 152 for the API service, the URL of the API server 152, the format of the API method for sending the API request and other relevant data for communicating with the API server 152 (FIG. 11, line 02). The backend worker 233 checks the parameters to ensure that they conform to their definitions in the API specification 240 (FIG. 11, line 03). The backend worker 233 determines, from the API specification 240 (which is identified from the API identifier), the API method and the URL for sending the API request to the API server 152 (FIG. 11, line 04). The backend worker 233 sends the API request to the API server 152 (FIG. 11, line 05; see FIG. 2, arrow 206), with the API request including the API method and API parameters and being sent to the URL of the API server 152 as indicated in the API specification 240.

The backend worker 233 receives a result, responsive to the API request, from the API server 152 (see FIG. 2, arrow 207). The backend worker 233 provides the result to the frontend module 231 for rendering or other operation depending on the result (FIG. 11, line 06; see FIG. 2, arrow 208). The backend worker 233 may communicate with the frontend module 231 by way of a web socket.

Embodiments of the present invention provide a framework that simplifies the design of a webpage UI. First, the webpage developer is able to create a webpage UI that accesses an API server simply by referencing an API identifier; the webpage developer does not have to keep track of the route to the API server, how to send an API request to the API server, etc. The details of making API requests can thus be defined at the frontend and the backend at the same time. Second, the web UI specification allows for defining the webpage UI, actions, and routes using a simple description language, e.g., in JSON format as in FIGS. 3-8. This allows the UI presentation layer required by the frontend and the business logic of the back end to be flexibly and automatically generated. Third, embodiments of the present invention provide a convenient integrated development environment to generate a webpage using the aforementioned description language. Standardized web UI specifications can be edited, and visual components may be manipulated by drag and drop methods to arrange screens of the website. New API servers can be readily added by providing a corresponding API specification with API identifiers.

FIG. 12 shows a flow diagram of a method 300 of providing content of an API server to a user computer in accordance with an embodiment of the present invention. The method 300 may be performed by the web server 141 running on the host 140. As can be appreciated, the method 300 may also be performed using other components without detracting from the merits of the present invention.

In step 301, a server computer system (e.g., FIG. 1, host 140) receives a web UI call that includes an API identifier and an API parameter from a user computer (e.g., FIG. 1, computer 120). The following steps 302-307 are also performed by the server computer system.

In step 302, an API specification that defines an API service having the API identifier is identified from among a plurality of API specifications.

In step 303, the API parameter is checked for conformance to the API specification.

In step 304, a route to an API server that is hosted by a second server computer system (e.g., FIG. 1, host 151) is determined from the API specification.

In step 305, in response to the API parameter conforming to the API specification, an API request is made to the API server. The API request includes the parameter and is sent to the API server using the route from the API specification.

In step 306, a result of the API request is received from the API server.

In step 307, communication is made with the user computer to render a component of the webpage using the result of the API request.

Figure 13:
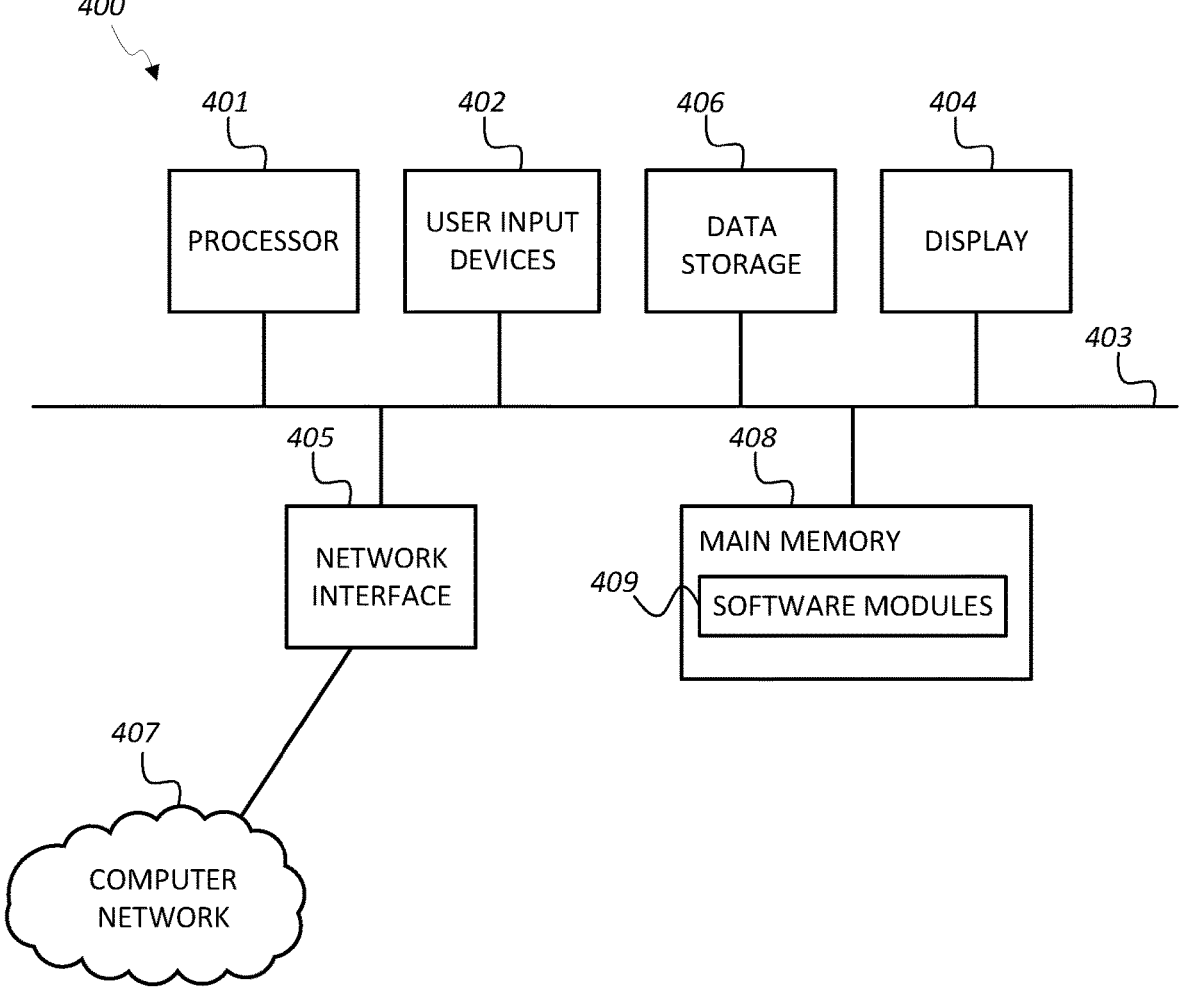
FIG. 13 shows a schematic block diagram of a computer system that may be employed in embodiments of the present invention.

Referring now to FIG. 13, there is shown a schematic block diagram of a computer system 400 that may be employed in embodiments of the present invention. The computer system 400 may be employed as a host or other computing device described herein. The computer system 400 may have fewer or more components to meet the needs of a particular application. The computer system 400 may include one or more processors 401. The computer system 400 may have one or more buses 403 coupling its various components. The computer system 400 may include one or more user input devices 402 (e.g., keyboard, mouse), one or more data storage devices 406 (e.g., hard drive, solid state drive), a display screen 404 (e.g., liquid crystal display, flat panel monitor), a computer network interface 405 (e.g., network adapter, modem), and a main memory 408 (e.g., random access memory). The computer network interface 405 may be coupled to a computer network 407, which in this example includes the public Internet.

The computer system 400 is a particular machine as programmed with one or more software modules 409, comprising instructions stored non-transitory in the main memory 408 for execution by a processor 401 to cause the computer system 400 to perform corresponding programmed steps. An article of manufacture may be embodied as computer-readable storage medium including instructions that when executed by at least one processor 401 cause the computer system 400 to be operable to perform the functions of the one or more software modules 409.

In an embodiment where the computer system 400 is configured as a server computer system that hosts a web server, the software modules 409 comprise the web server. In an embodiment where the computer system 400 is configured as a server computer system that hosts an API server, the software modules 409 comprise the API server.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of providing content of an application programming interface (API) server to a user computer, the method comprising:

receiving a first user interface (UI) call from a user computer, the first UI call including an application programming interface (API) identifier;

after receiving the first UI call, identifying an API specification that defines an API service that has the API identifier from among a plurality of API specifications;

determining, from the API specification, whether a parameter included in the first UI call conforms to the API specification;

determining, from the API specification, a route to an API server that processes an API request for the API service;

in response to the parameter conforming to the API specification, making the API request to the API server, the API request to the API server including the parameter included in the first UI call and routed in accordance with the route from the API specification;

receiving, from the API server, a result of the API request; and rendering a component of the webpage using the result of the API request.

2. The method of claim 1, further comprising:

identifying the first UI call as corresponding to a web UI specification;

identifying the API identifier in the first UI call; and sending the API identifier and the parameter to a message queue.

3. The method of claim 1, further comprising:

receiving a second UI call from the user computer;

identifying the second UI call as corresponding to the web UI specification; and rendering a component of the webpage in the user computer in accordance with the web UI specification.

4. A system comprising:

a user computer comprising a memory and at least one processor, the memory of the user computer storing instructions that when executed by the at least one processor of the user computer cause the user computer to:

send a first user interface (UI) call to a first server computer system, the first UI call including an application programming interface (API) identifier and a parameter; and render a first component of the webpage using a result of an API request; and the first server computer system comprising a memory and at least one processor, the memory of the first server computer system storing instructions that when executed by the at least one processor of the first server computer system cause the first server computer system to:

receive the first UI call;

identify an API specification that corresponds to the API identifier from among a plurality of API specifications;

determine, from the API specification, whether the parameter included in the first UI call conforms to the API specification;

determine, from the API specification, a route to an API server that processes the API request;

in response to the parameter conforming to the API specification, make the API request to the API server, the API request to the API server including the parameter included in the first UI call and routed in accordance with the route from the API specification; and receive, from the API server, the result of the API request.

5. The system of claim 4, further comprising:

a second server computer system comprising a memory and at least one processor, the memory of the second server computer system storing instructions that when executed by the at least one processor of the second server computer system cause the second server computer system to:

receive the API request; and provide the result of the API request to the first server computer system.

6. The system of claim 4, wherein the instructions stored in the memory of the first server computer system, when executed by the at least one processor of the first server computer system, further cause the first server computer system to:

identify the first UI call as conforming to a web UI specification;

identify the API identifier from the first UI call; and send the API identifier and the parameter to a message queue.

7. The system of claim 4, wherein the instructions stored in the memory of the first server computer system, when executed by the at least one processor of the first server computer system, further cause the first server computer system to:

receive a second UI call from the user computer;

identify the second UI call as conforming to the web UI specification; and communicate with the user computer to render a second component of the webpage in accordance with the web UI specification.

* * * * *